United States Patent
Detlefs

(10) Patent No.: US 7,058,781 B2
(45) Date of Patent: Jun. 6, 2006

(54) PARALLEL CARD TABLE SCANNING AND UPDATING

(75) Inventor: David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 534 days.

(21) Appl. No.: 10/366,959

(22) Filed: Feb. 14, 2003

(65) Prior Publication Data

US 2004/0162860 A1    Aug. 19, 2004

(51) Int. Cl.
*G06F 12/00* (2006.01)

(52) U.S. Cl. ....................... 711/170; 707/206

(58) Field of Classification Search ................ None
See application file for complete search history.

(56) References Cited

U.S. PATENT DOCUMENTS

| | | | |
|---|---|---|---|
| 5,903,900 A | 5/1999 | Knippel et al. | |
| 6,098,080 A | 8/2000 | Endicott et al. | |
| 6,148,310 A * | 11/2000 | Azagury et al. | ............ 707/206 |
| 6,212,608 B1 | 4/2001 | Bak | |
| 6,434,577 B1 | 8/2002 | Garthwaite | |
| 6,539,464 B1 | 3/2003 | Getov | |
| 6,658,652 B1 | 12/2003 | Alexander et al. | |
| 6,684,392 B1 | 1/2004 | Eidt | |
| 2004/0111445 A1 * | 6/2004 | Garthwaite et al. | ......... 707/206 |

OTHER PUBLICATIONS

Unknown, "Numbers and Their Application—Lesson 17—Logarithmic Properties", http://www.andrews.edu/~calkins/math/webtexts/numb17.htm, Nov. 7, 2005.

* cited by examiner

*Primary Examiner*—Reginald G. Bragdon
*Assistant Examiner*—Craig E Walter
(74) *Attorney, Agent, or Firm*—Kudirka & Jobse, LLP

(57) ABSTRACT

During a collection interval, if a multi-threaded generational, copying garbage collector finds that a card contains a reference to a younger generation, it gives a corresponding card table entry a youngergen value selected from a plurality of youngergen values at the beginning of the interval as the "current" youngergen value. The youngergen value chosen for a given collection interval differs from the one that was chosen for the previous collection interval. As a result, a collector thread is able to distinguish between a card in which a reference to the younger generation remained at the end of the previous interval and one identified by some other thread during the current interval as referring to a young-generation object. In that way, the thread is able to avoid unnecessary scanning.

42 Claims, 10 Drawing Sheets

PARALLEL CARD TABLE SCANNING AND UPDATING

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects "dynamically." Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data and instructions for operating on them that a microprocessor 11 uses may reside in onboard cache memory or be received from further cache memory 12, possibly through the mediation of a cache controller 13. That controller 13 can in turn receive such data from system read/write memory ("RAM") 14 through a RAM controller 15 or from various peripheral devices such as communications controller 16 through a system bus 17. The memory space made available to an application program may be "virtual" in the sense that it can actually be considerably larger than RAM 14 provides. So the RAM contents will be swapped to and from a system disk 18.

Additionally, the physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 18 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Memory leaks and dangling references often result from a programmer's using interfaces like malloc( )/free( ) to manage dynamically allocated memory explicitly.

A way of reducing the likelihood of such errors is automatically to provide techniques of memory-space reclamation that are more systematic. Such techniques are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a systematic way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 18 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code.

In one approach to garbage collection, the compiler 20, without the programmer's explicit direction, additionally generates code that automatically reclaims unreachable memory space. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3. FIG. 3 depicts an example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted by electromagnetic signals to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps.

In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the heap, although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in a basic root set 52. The basic root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. Most new objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references may have been written since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins).

The entries made by most write-barrier implementations simply indicate that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller.

Since young generations are small and collected frequently, it may take relatively little time during old-generation collection to scan all young-generation objects for references into the old generation. On the other hand, laboriously scanning the entire mature generation for references to young-generation (or mature-generation) objects would ordinarily take too long. So some collectors use card tables only for mature-generation references; they do not use them for finding young-generation references that refer to mature-generation objects. In other words, only the old generation in such collections is divided into cards with which respective card-table entries are maintained.

As was mentioned above, that card table's principle purpose is to indicate where references have been added or modified since the last collection interval. In certain collectors, the heap is divided into segments (typically larger than the cards) for which the collector maintains respective "remembered sets" of locations when references to objects in those segments have been found. In each collection interval, the cards identified by the card table as containing new or modified references are scanned, and the locations of the references thus found are recorded in the remembered sets associated with the heap segments containing the objects to which the thus-found references refer.

So, whereas the card table is used to indicate the location only of the references—and principally only of those that have been added or modified since the previous collection interval—the remembered sets are associated with the locations of the objects to which the references refer, and they include entries for locations where references to these objects have been found anytime since that segment was last collected, not just since the previous collection interval. Of particular relevance to the present invention, though, is the type of collector in which the card table itself serves as a remembered set for one of the segments. Usually, that segment is the whole young generation.

For example, suppose that, in a collection interval in which it is collecting the young generation, a collector employing this approach reads through the card table and encounters an entry that has a "dirty" value. That is, its value is the one used by a write barrier to indicate that a reference was added or modified in the associated card since the previous collection interval. Being thus alerted to the possibility of a reference to a young-generation object, the collector searches that card. The search may reveal only references to objects in the old generation. The collector may need to record these references in separate remembered-set structures maintained for references to old-generation objects. Since the card table is used as a remembered set only for the young generation, though, the collector changes the entry's value from the "dirty"-indicating value to a "clean"-indicating value: the card contains no references to young-generation objects.

But now consider the steps taken by the collector if it does encounter a reference to a young-generation object. It cannot rule out the possibility that the old-generation object containing that reference is reachable; in collecting the young generation, the collector does not trace reference chains from the basic root set once they reach the old generation. So the young-generation object to which the reference refers must be considered potentially reachable, and the collector takes appropriate action.

In the case of a collector that collects the young generation in accordance with the semi-space approach described above, that action may be to relocate the object into the young generation's other semi-space. If the referred-to object thus remains in the young generation, a reference to a young-generation object remains, and the collector will need to be aware of that fact during a subsequent collection interval. So, since the collector is using the card table to contain the young generation's remembered set, it makes an entry in that table. To remember the location for that purpose, the collector could simply write the dirty-indicating value back into the appropriate card-table field. Because of other uses for the card table, though, it is often necessary to distinguish between cards that have been modified since the previous interval and cards that have not been modified but nonetheless need to be scanned during young-generation collection. So the collector uses a different value, which we will call youngergen.

A youngergen value can result not only from dirty-card scanning in the manner just described but also from "promotion." When a young-generation object identified as potentially reachable has met the collector's promotion criteria, the collector promotes the object, i.e., relocates it from the young generation to the old generation. The object thus relocated may itself include a reference to a young-generation object; the promotion has added to the old generation a reference that needs to be remembered for future collections. So the collector will in this case, too, place the youngergen value into the appropriate card-table field.

In short, the card table serves not only as a mechanism for communication between the mutator and the collector but also as a way for the collector to record against the young generation the locations in the old generation where references to the young generation occur. By thus having the card table do double duty, the garbage collector employs memory space efficiently.

But thus employing the card table for two purposes can present problems if the garbage collector is executed in multiple threads. A multi-threaded program written in a garbage-collection language such as the Java programming language may be so written that thread-level parallelism scales appropriately as the number of processors increases. As was stated above, moreover, some garbage collection can be performed concurrently with mutator operation: one or more garbage-collector threads may be executing concurrently with mutator threads.

But it is usually necessary for certain parts of collector operation to be performed in dedicated garbage-collection intervals, in which all mutator threads have been stopped. And there are aspects of young-generation collection that make it desirable for all young-generation collection to be performed in such intervals. If the garbage collector were to execute in a single thread during such intervals, the overall application would not scale well even if the mutator is taking maximum advantage of the multiprocessor architecture. So it is important for the collector to exploit the benefits of multi-threaded operation during such intervals.

In the type of card-table use described above, though, thus executing in multiple; threads can result in unnecessary work. For example, consider a situation in which a first garbage-collection thread promotes an object into a given old-generation card and processes that object's references. If one of those references refers to a young-generation object, that first garbage-collection thread will, as was explained above, give the appropriate card-table entry the youngergen value. Now, that entry's value may have been clean before that change: it may have indicated that there was no need to scan the card. If so, there is no need after the promotion for the collector to scan the card during the current collection interval, either; the promoting thread scanned the promoted object's references, and there were otherwise no references in that card that refer to young-generation objects. If a second thread is scanning the old generation for references to young-generation objects and encounters that youngergen value, though, it scans that card even though doing so is unnecessary. In short, some of the benefit of multi-threaded execution has been compromised.

And multi-threaded execution presents another, more-serious problem. Consider a scenario in which a first thread is scanning for dirty cards and observes that card C's card-table entry has a non-clean value, i.e., one whose value is dirty or youngergen. The appropriate response to this is for the thread to set that entry to clean and to scan the card's objects. But suppose that a second thread has promoted an object onto card C and writes the youngergen value into that entry between the time at which the first thread observes the non-clean entry and the time at which it sets the entry to clean. When the first thread then sets the entry's value to clean, it wipes out the youngergen value. If it finds no references to the younger generation, that card's entry remains clean even though it does contain a reference to a young-generation object. If that card remains unmodified until the next collection interval and the referred-to object is not referred to by any other reference, the collector will incorrectly conclude that the referred-to object is not potentially reachable and will reclaim the space that it occupies.

SUMMARY OF THE INVENTION

I have developed a way of overcoming these problems. In accordance with this invention, there is more than one youngergen value: a plurality of values are recognized as representing the potential presence of a reference to a younger-generation object. During a given collection interval in which the young-generation is collected, one of those values is adopted as the "current" younger-generation-indicating value, and this is the value given to a card-table entry when a surviving young-generation object is promoted into the corresponding old-generation card. As usual, this value will be recognized during a subsequent interval as indicating that the card should be scanned for references to young-generation objects. For that subsequent interval, though, the collector adopts a different one of the young-generation-indicating values as the current young-generation-indicating value, recognizing the previous interval's current young-generation-indicating value as the "previous" younger-generation-indicating value.

When a thread that is scanning the card table encounters an entry whose value is the one that it has adopted as the previous younger-generation-indicating value, it proceeds as before: it scans the corresponding card for references into the younger generation. If it instead encounters the current younger-generation-indicating value, though, it refrains from scanning the corresponding card, since the only objects in that card containing references to younger-generation objects are those that were promoted during the current interval and have already had there references scanned in the process. In this way, the collector avoids some unnecessary old-generation scanning.

BRIEF DESCRIPTION OF THE DRAWINGS

The invention description below refers to the accompanying drawings, of which.

DETAILED DESCRIPTION OF AN ILLUSTRATIVE EMBODIMENT

As was mentioned above, the present invention concerns an improved way of employing a card table covering an older generation as a remembered set for a younger generation. It can therefore be employed in a wide range of generational garbage collectors. For the sake of concreteness, though, we will describe the invention by reference to an embodiment that treats the heap as divided into only two generations, namely, a young generation and an old generation. Also for the sake of concreteness, we will assume that the young generation is collected completely in a single interval dedicated to collection only but that most of the old-generation-collection operation occurs concurrently with mutator execution. Again, this is assumed only for the sake of concreteness; nothing about the invention requires such an arrangement.

Now, any collector that employs the present invention's teachings will execute at least portions of the young-generation collection in a plurality of concurrently executing threads. For example, the collector could employ two concurrent threads, one of which processes references into the young generation from the basic root set, the other of which processes references from the old generation. For the sake of concreteness, though, we will assume an approach in which multiple threads scan the old generation concurrently for references into the young generation.

The particular way in which the threads divide up the task of scanning the old generation is not of particular interest here, so we will simply assume an approach in which the cards are divided into as many subsets as there are threads, each thread is assigned a different subset at the beginning of an interval, and each card is scanned only by the thread to which that card has been assigned. Of course, other embodiments may achieve superior load balancing by, for instance, dividing the old generation into more card groups than there are threads, assigning only some of the groups to threads initially, and then having threads contend for unclaimed card groups when they have finished processing the entries in the card groups assigned to them.

Figure 1:
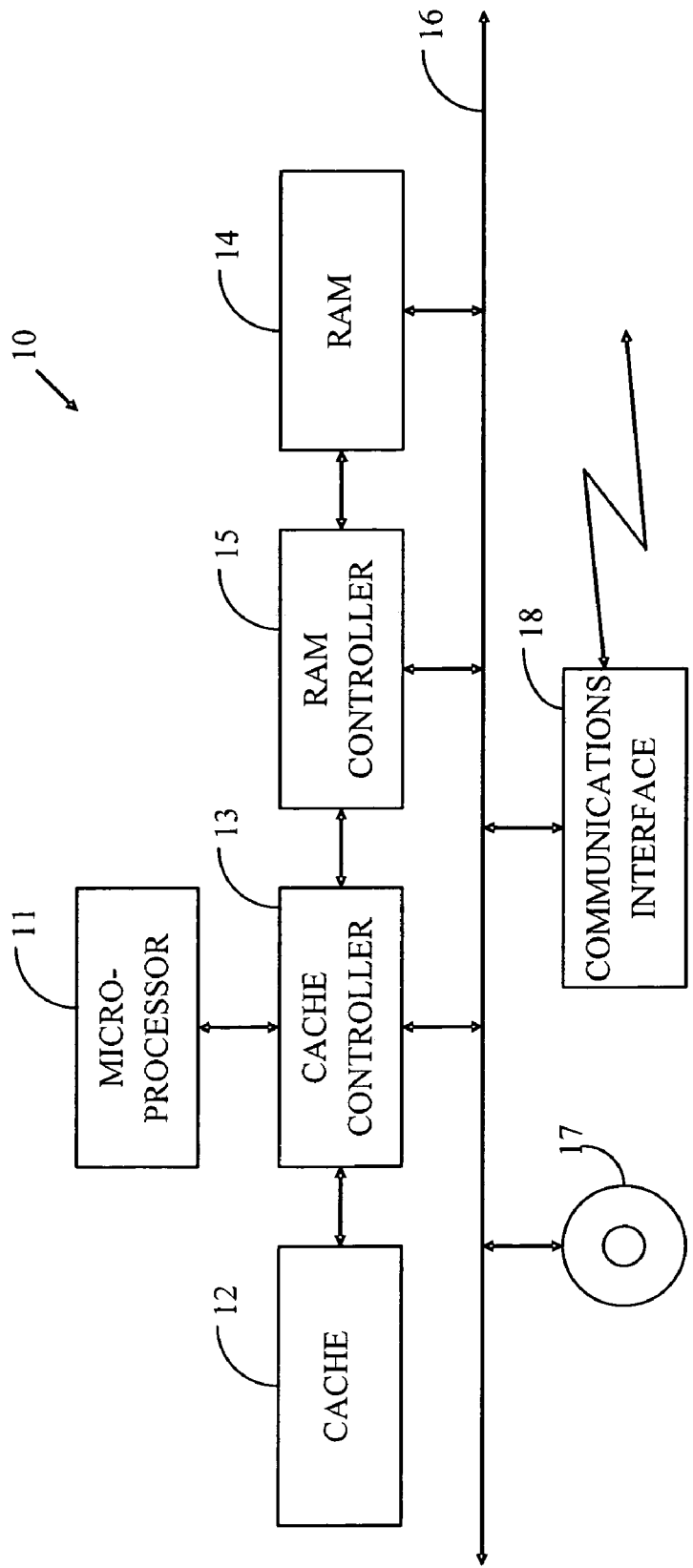
FIG. 1, discussed above, is a block diagram of a computer system in which the present invention's teachings can be practiced.
Figure 2:
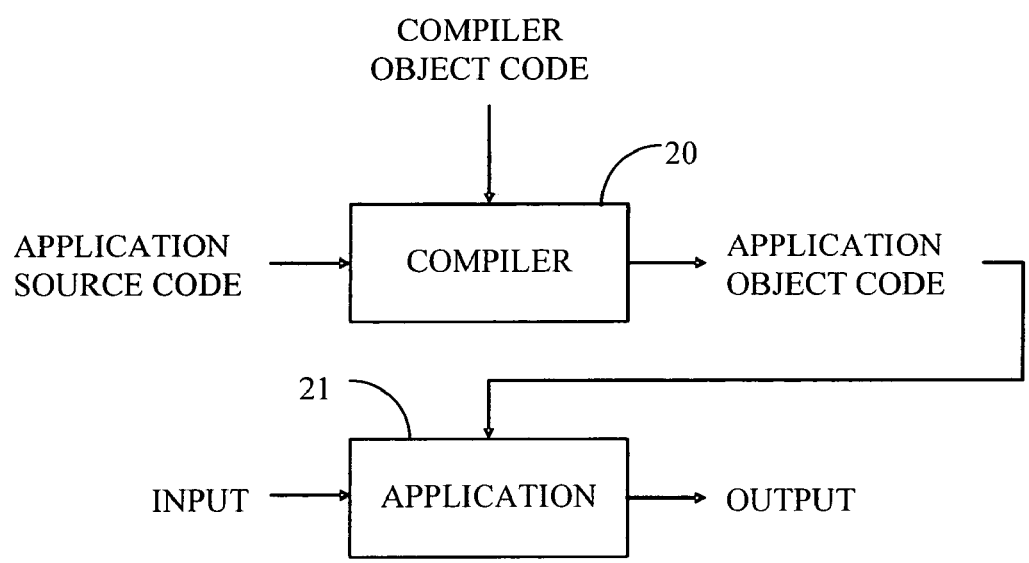
FIG. 2 as, discussed above, is a block diagram that illustrates a compiler's basic functions.
Figure 3:
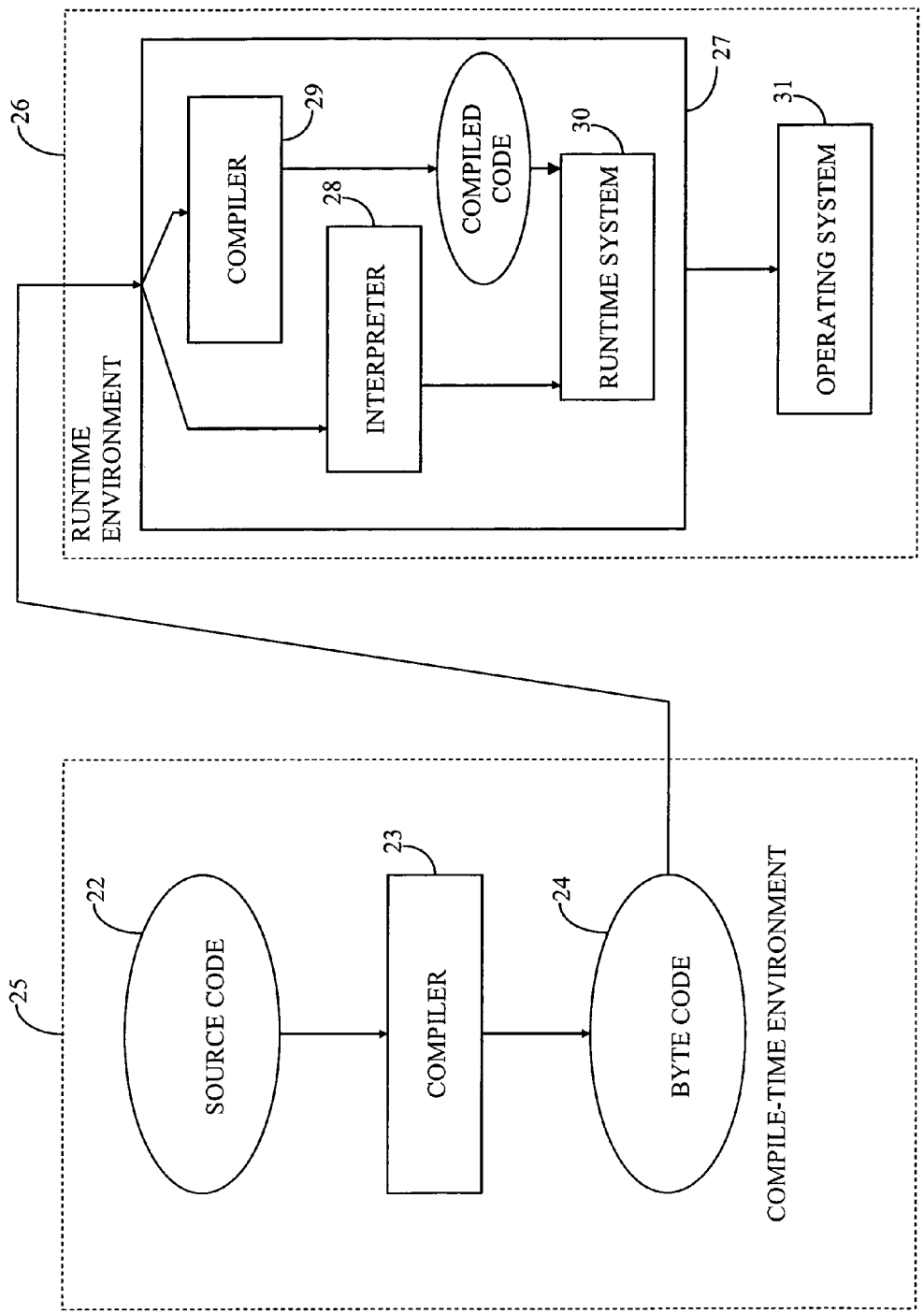
FIG. 3, discussed above, is a block diagram that illustrates a more-complicated compiler/interpreter organization.
Figure 4:
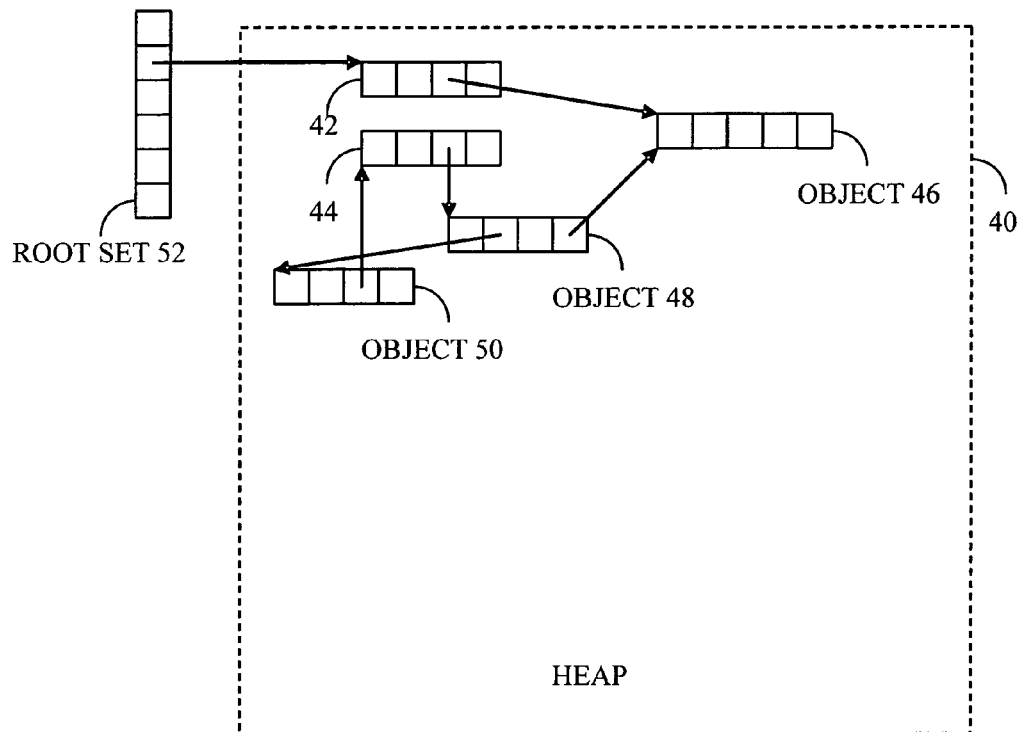
FIG. 4, discussed above, is a diagram that illustrates a basic garbage-collection mechanism.
Figure 5:
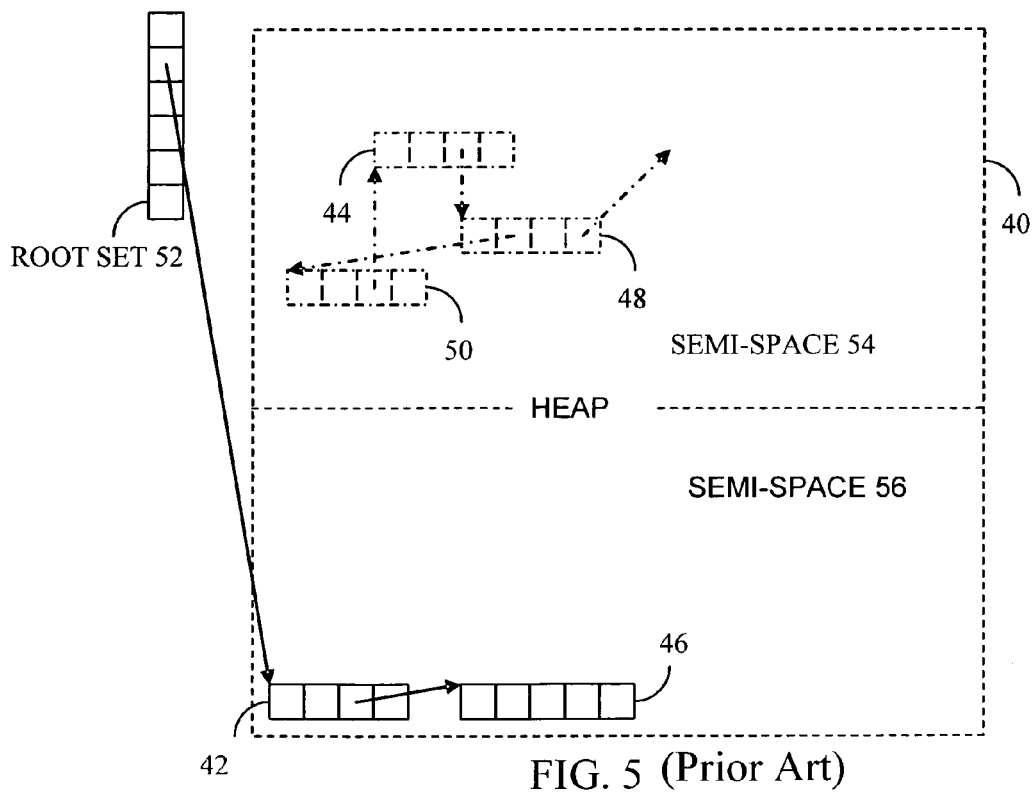
FIG. 5, discussed above, is a similar diagram illustrating that garbage-collection approach's relocation operation.
Figure 6:
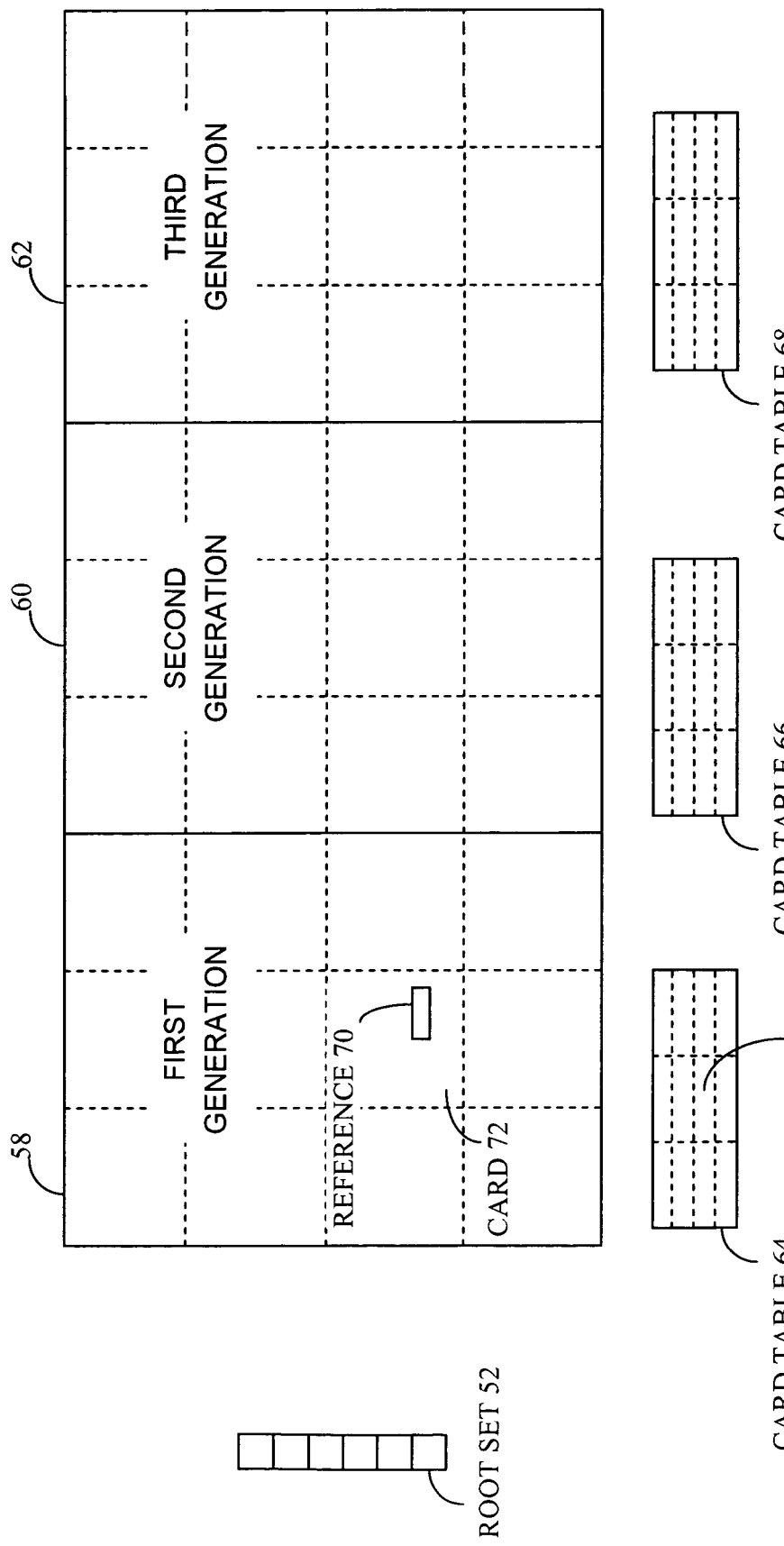
FIG. 6, discussed above, is a diagram that illustrates a garbage-collected heap's organization into generations.
Figure 7A:
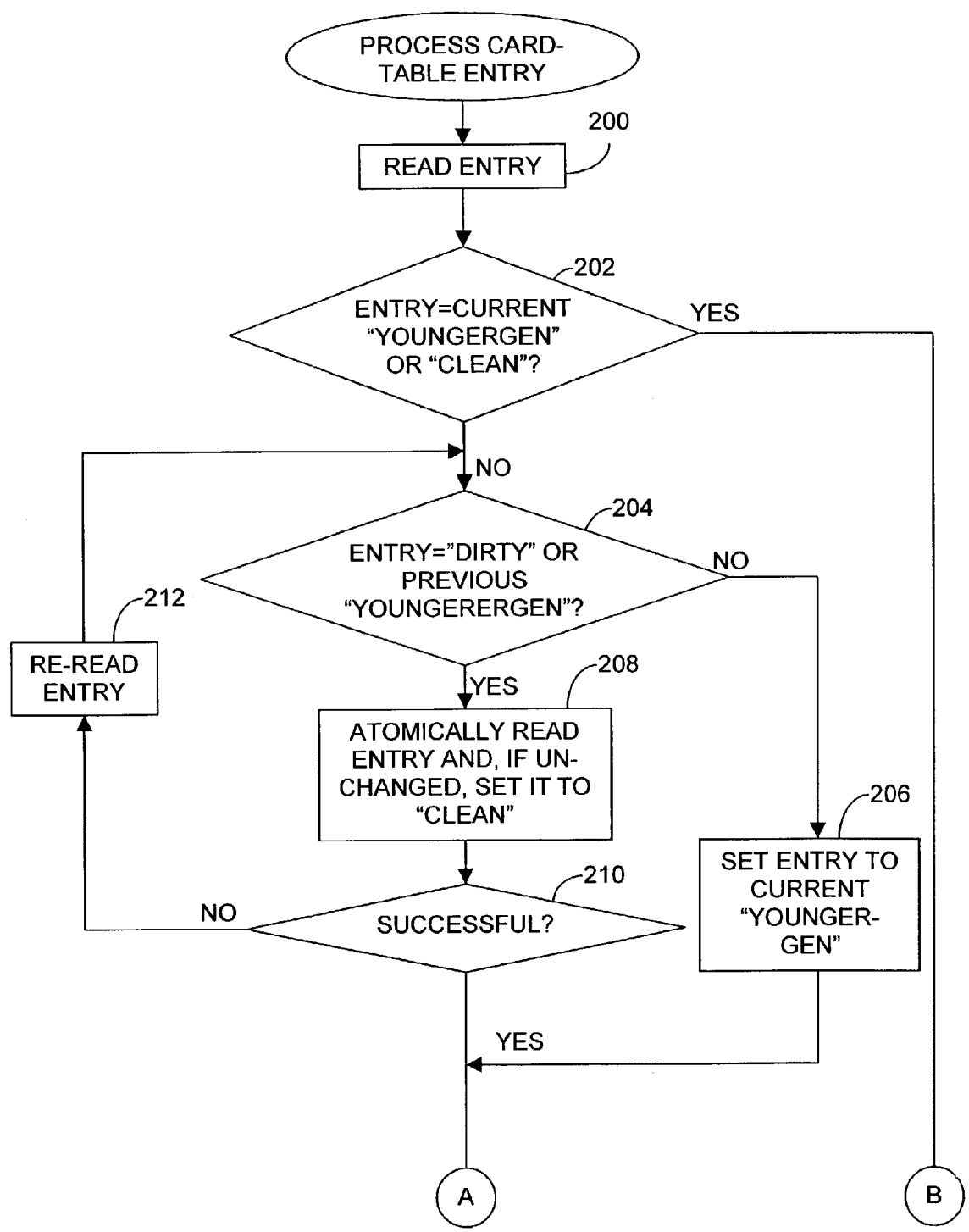
FIGS. 7A and 7B together constitute a flow chart of a routine employed by an embodiment of the present invention to process a card-table entry.
Figure 7B:
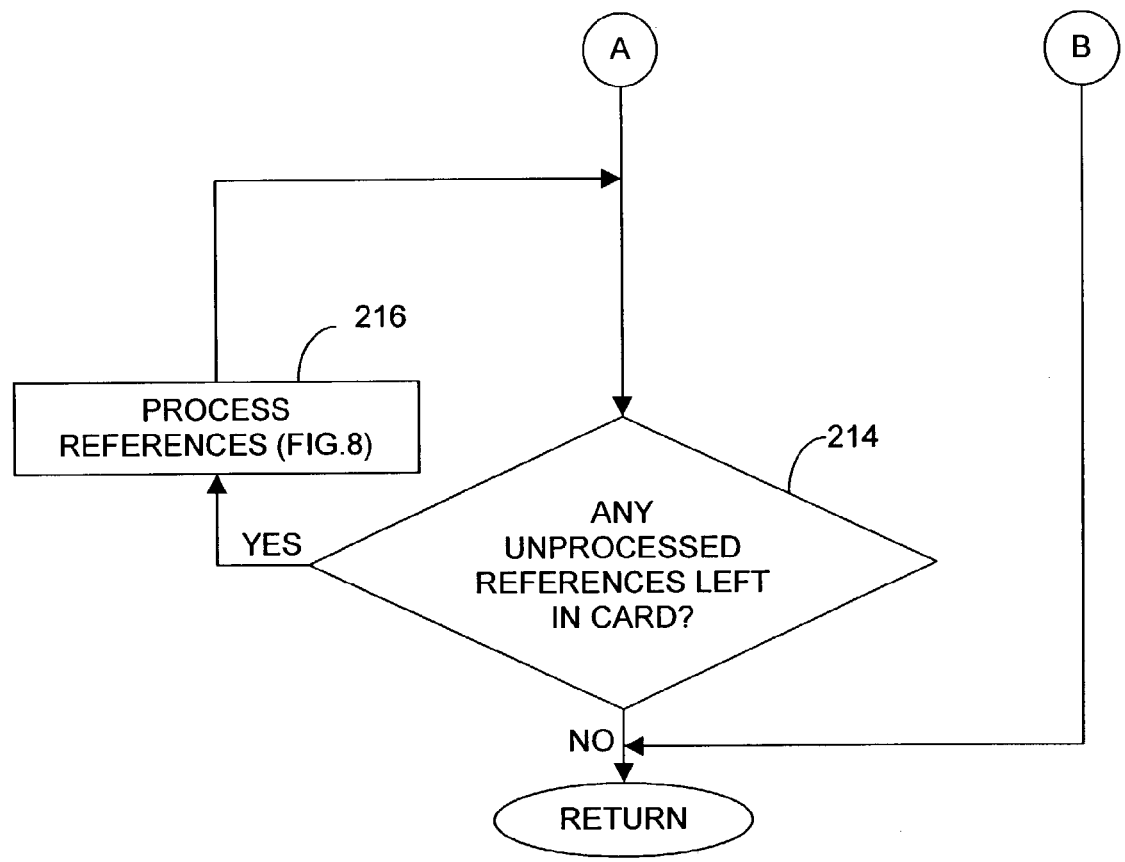

FIGS. 7A and 7B (together, "FIG. 7") are a flow chart of a routine that an embodiment can use to process a card-table entry. As blocks 200 and 202 indicate, a thread that is processing a card-table entry begins by determining what the entry's value is. As was mentioned above, one possible value is clean, which means that the associated card need not be scanned. As was also mentioned above, a system that employs the present invention will interpret several other possible values as youngergen. In each young-generation collection, one such value is chosen as the "current" youngergen value for that collection. Each collection's youngergen value is different from the youngergen value that was chosen as the current youngergen value for the previous collection. The current youngergen value indicates that the corresponding card contains a reference into the young generation and will therefore need to be scanned during the next collection. But the current youngergen value also indicates that the associated card need not be scanned. This is because a thread gives a card's table entry the current youngergen value when it promotes into that card an object containing a reference into the young generation, and a thread that does so has that object's references processed to identify the young-generation objects referred to as potentially reachable. Since the promoting thread has thereby taken care of processing the promoted object's references, the card does not need to be scanned merely because of that promoted object's references. As FIG. 7 indicates, therefore, a thread that is processing a card-table entry does not scan the card corresponding to that card-table entry if the block-202 operation reveals that the card-table entry's value is clean or the current youngergen value.

If the test represented by block 202 does not indicate that the card-table entry's value is clean or the current youngergen value, on the other hand, then the thread will need to scan the associated card for references into the young generation. We digress at this point to note that the operation of scanning a card may include inspecting some references that are not actually located in the card. Conversely, it may omit inspecting some references that are. Whether it does depends in part on which style of card marking the collector uses. In collectors that use precise card marking, the card-table field corresponding to a reference's location is simply the one associated with the card that contains the reference. But some collectors use imprecise card marking, in which the card-table field corresponding to a reference's location is the one associated the card in which the object containing the reference begins. If an object straddles a card boundary, it may include references located in other cards. So the scanning of a card by a collector that employs imprecise card marking may include inspecting references in subsequent cards. It may also omit scanning that part of the card occupied by an object that starts in a previous card. But some implementations employ the union of these two approaches: the range scanned in response to a card-table entry includes (1) all references contained in objects that begin in the associated card and (2) all other references in the card, independently of whether they belong to an object that begins in another card.

In any event, the scanning thread will need to update the card-table entry so that it will have the proper value at the beginning of the subsequent young-generation collection. This updating operation can be performed at any time after the thread has read the entry to determine whether to scan the card. In the illustrated embodiment, it does so immediately. And the thread performs the operation represented by block 204 in order to determine the value with which to update the card-table entry.

To appreciate this, recall the above discussion in which the meaning of the current youngergen value was explained. As was stated there, the current youngergen value indicates that a card-scanning thread does not need to scan the corresponding card, and that value is sometimes given to the card-table entry by a thread that has promoted into the corresponding card an object that contains a reference to a young-generation object. As will be seen, though, a promoting thread gives the card-table entry the current youngergen value only in those situations in which the card-table entry's previous value did not call for the card to be scanned, i.e., only if the entry's value was clean. If the entry's value was not clean, the promoting thread should not indicate to a subsequent scanning thread that the card needs no scanning. So, if the entry's value was one of the "non-clean" values, i.e., dirty or the previous youngergen value, the promoting thread instead gives the card-table entry a different value, cur_youngergen_and_nonclean, which the collector interprets as indicating that the card still needs scanning and that the card-table entry should have the current youngergen value at the end of the current young-generation collection. Note that the effect of the previous youngergen value is the same as that of the dirty value as far as the young generation's collection is concerned: they both indicate a "non-clean" state. In principle, therefore, the write barriers could be designed to enter the previous youngergen value instead of the dirty value. That is, the value entered by a write barrier could alternate at collections. In practice, though, there is little advantage to this approach, and, in any event, other aspects of collector operation will usually depend on distinguishing references that are newly modified from those that are not. So most embodiments will use a separate dirty value. Indeed, some embodiments will use more possible entry values then the illustrated embodiment does.

In the illustrated embodiment, though, the only possible entry values are clean, dirty, the current or previous youngergen values, and cur_youngergen_and_nonclean. So a negative outcome of the block-204 test indicates that the card-table entry has the cur_youngergen_and_nonclean value. As block 206 indicates, the scanning thread therefore sets the card-table entry to the current youngergen value before it proceeds to scan the corresponding card.

If the block-204 test's result is affirmative, on the other hand, i.e., if the entry's value is dirty or the previous youngergen value, then the illustrated embodiment attempts to set the entry's value to clean. This will be the entry's value at the end of the collection if the scanning thread finds no reference to a young-generation object that remains in the young generation. As block 208 indicates, though, this updating of the entry value must be performed atomically with a re-reading of the entry to ensure that it has not been changed since the thread read it initially. This is necessary in order to avoid losing reference-location information.

Specifically, suppose that, after the scanning thread initially reads a dirty value but before it updates the entry's value to clean, a promoting thread sets the entry to the current cur_youngergen_and_nonclean value, as discussed above. If the scanning thread's updating operation were not performed atomically with a re-reading operation, the scanning thread would set the entry's value to clean. The card table would thereby lose the indication that the card contains a reference to a young-generation object. During the subsequent young-generation collection, the scanning thread could therefore fail to scan the card, possibly with the untoward result that a reachable object's memory space is reclaimed.

To avoid such a result, the thread atomically re-reads the entry and updates the entry only if the entry has remained unchanged—i.e., only if it still has the dirty value or the previous youngergen value. If that operation detects a change, the atomic operation fails: the thread does not write the clean value into the entry. Instead, as blocks 210 and 212 indicate, the thread returns to the operation of block 204 and presumably finds the cur_youngergen_and_nonclean value. It therefore performs the block-206 operation of giving the entry the current youngergen value rather than the clean value.

In any event, the thread proceeds to scan the card after it updates the entry. As blocks 214 and 216 indicate, that is, it proceeds from object to object within the card and processes any references in those objects until it has determined that all references have been processed. In some embodiments, this will mean scanning all of the objects in the card. In the illustrated embodiment, though, the thread does not scan objects that have been promoted during the current collection. Objects that have been thus promoted are so marked, and the scanning thread checks objects as it goes along to determine whether they were promoted during the current collection. When the scanning thread finds an object that has been marked as having been promoted during the current collection, it refrains from scanning it, because the thread that promoted it will have already arranged to have it scanned.

Figure 8:
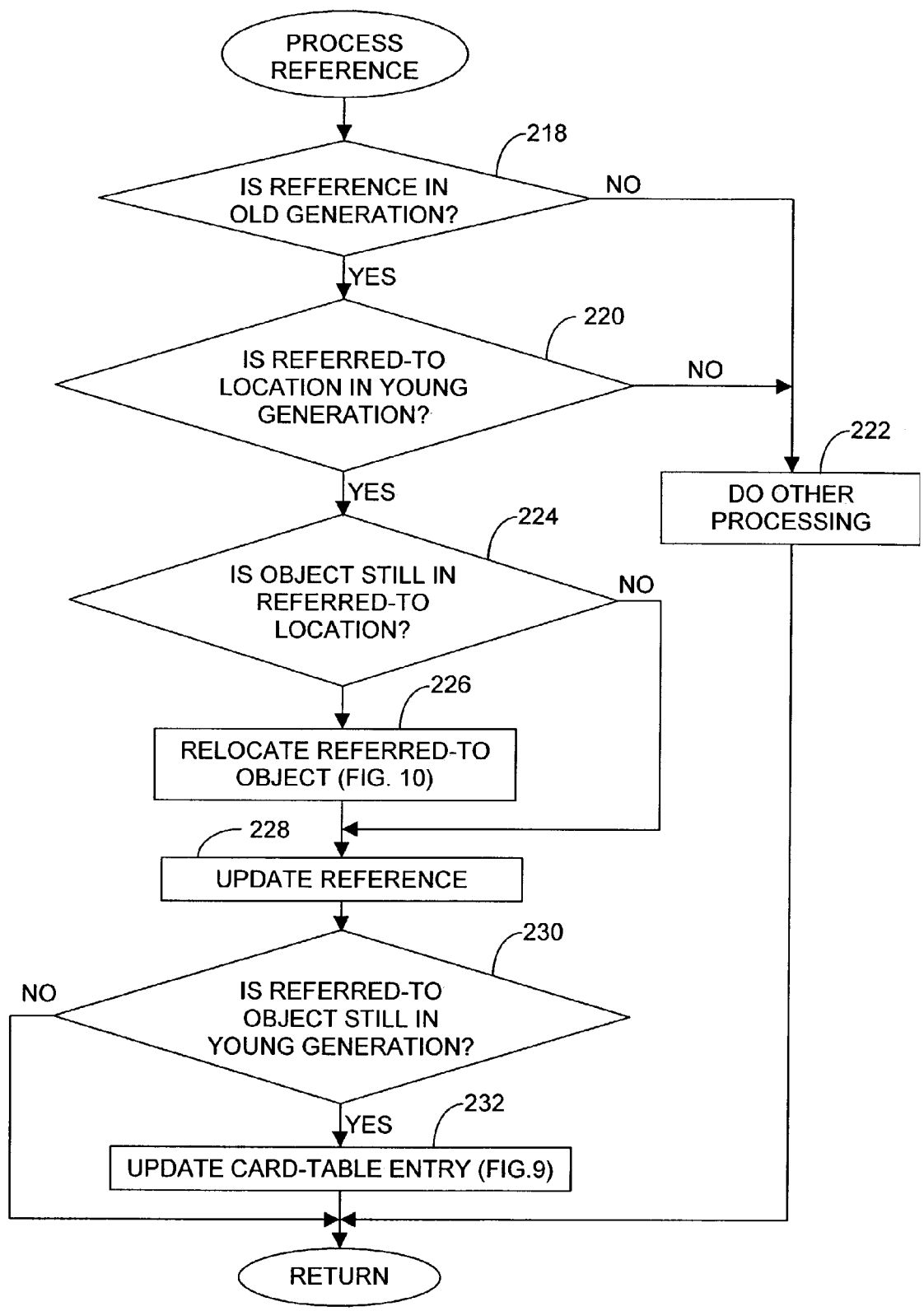
FIG. 8 is a flow chart of a routine employed by that embodiment to process references thereby found.

In other objects, it processes each reference in a manner that FIG. 8 illustrates. Recall that we are concerned in this embodiment only with the type of reference processing that is performed on references that are located in the old generation but refer to objects located in the young generation. To emphasize this fact, FIG. 8 includes blocks 218, 220, and 222 to indicate that other references are subjected to other types of processing. These blocks are largely conceptual; in most embodiments, the routine that is called to process an old-generation reference as part of young-generation collection would actually not include the "other" processing that block 222 represents. That is, most embodiments will segregate the programming for different generations' collection. Therefore, even though an old-generation reference found during young-generation collection will eventually need to be processed, it will not in most embodiments be processed during young-generation collection unless it refers to a young-generation object. In most embodiments, that is, the old generation will need to be scanned again—and its references found anew—during old-generation collection.

In any event, a reference found to refer to a young-generation location will indeed be subjected to processing. As block 224 indicates, an initial step in this processing is to determine whether an object remains in the referred-to location. When a potentially reachable object is found in the young generation, the illustrated embodiment will move it, either by relocating it to the young generation's other semi-space or by promoting it to the old generation. In both cases, the promoting thread will leave in the memory space previously occupied by that object an indication that the object has been moved and an identifier of the moved object's new location. Block 224 represents the step of checking for an indication that the object has been moved. If it has not, the thread moves it itself, as block 226 indicates. In some embodiments, this will always mean promoting the (potentially reachable) object into the old generation. In other embodiments, the collector will maintain an "age" indicator for each young-generation object to indicate how many young-generation collections have occurred since the object was initially allocated in the young generation. If this age value is not high enough, the object is relocated in the young generation. Otherwise, it is promoted into the old generation.

Independently of whether the referred-to object was already relocated or the thread relocates the object itself, the old-generation reference that refers to that object needs to be updated to indicate the object's new location. Block 228 represents performing that task.

If a test represented by block 230 indicates that the referred-to object is still in the young generation, the card-table entry must be updated to reflect this fact; as was stated above, the card table is used not only to indicate whether references have been modified between collections but also, in the case of references to young-generation objects, to remember where such references were previously found. As block 232 indicates, therefore, the thread will perform the appropriate updating, as will be explained below by reference to FIG. 9. If the block-230 test finds that the referred-to object is no longer in the young generation, though, the illustrated embodiment performs no card-table updating. In the illustrated embodiment, such a situation arises when the referred-to object has been promoted to the old generation. Since we are concerned here with the way in which the card table is maintained, FIG. 8 depicts the reference-processing routine as simply returning if the outcome of the block-230 test is negative, i.e., if the referred-to object is no longer in the young generation. Actually, though, most embodiments will update a separate remembered-set structure in such a situation: the reference-processing operation will typically include some remembered-set updating even when the referred-to object is not still in the young generation.

Figure 9:
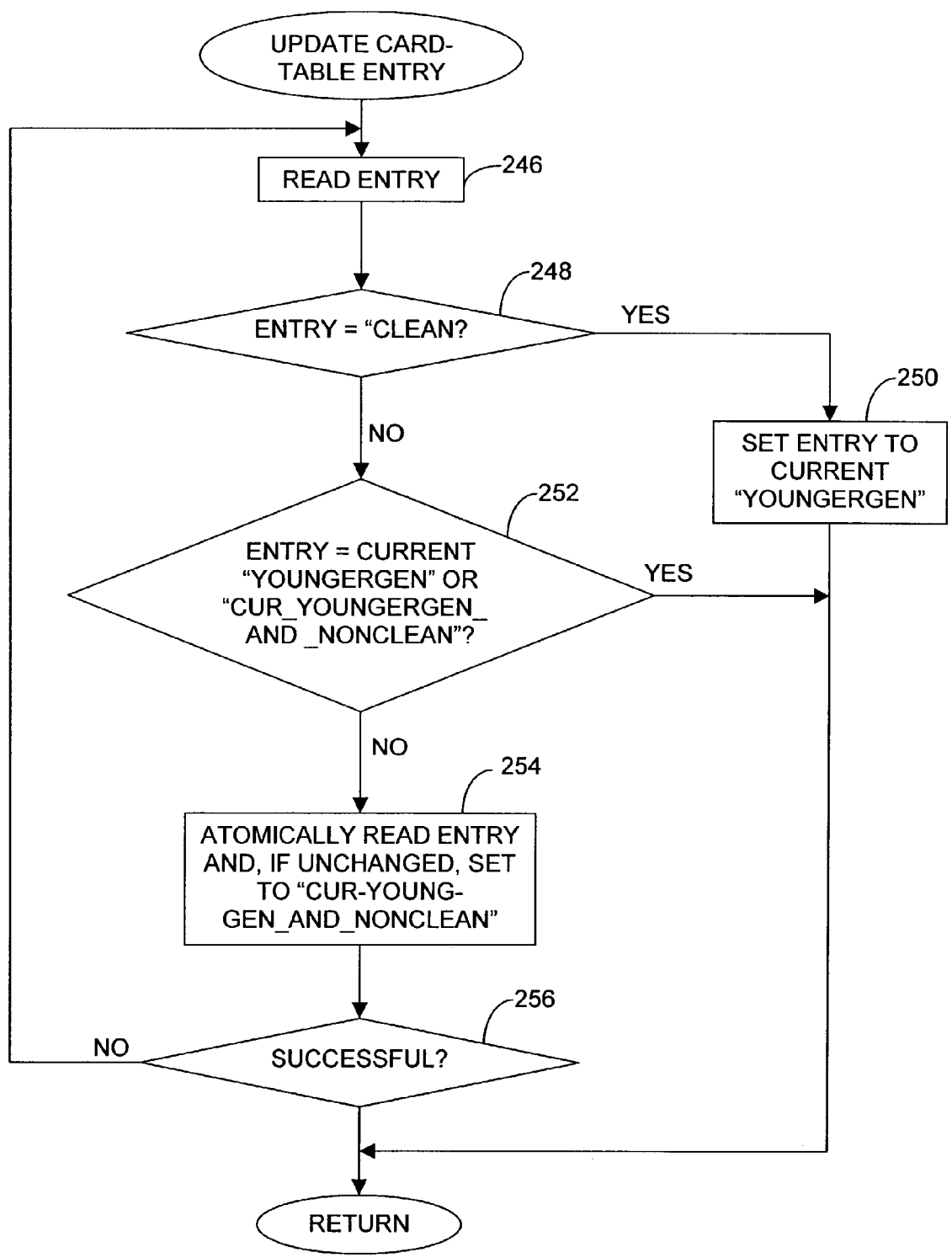
FIG. 9 is a flow chart of a routine employed by that embodiment to update card-table entries.
Figure 10:
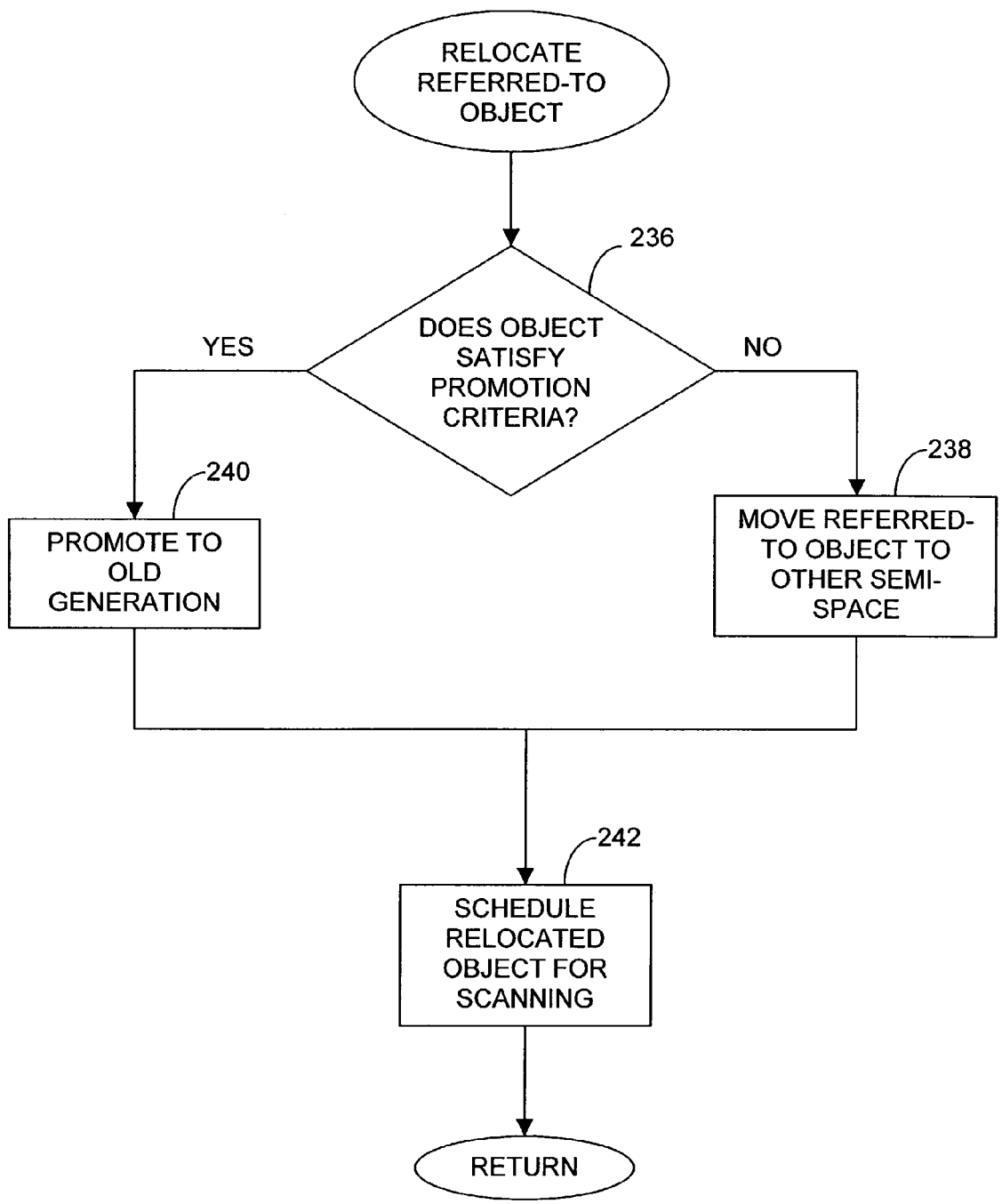
FIG. 10 a flow chart of a routine employed by that embodiment to relocate objects referred to by the processed references.

FIG. 9 indicates how the illustrated embodiment performs the block-232 operation of updating a card-table entry when the scanning operation finds a reference to an object that remains in the young generation. To understand the card-table-entry-updating operation that FIG. 9 illustrates, it is important to recognize that in the illustrated embodiment uses a routine similar to that of FIG. 8 not only for the operation represented by FIG. 7's block 216 but also for scanning relocated objects. FIG. 10 depicts in more detail the relocation operation represented by FIG. 8's block 226. As FIG. 10's block 236 indicates, the thread determines whether the object to be relocated satisfies the promotion criteria that the system imposes. If not, the illustrated embodiment moves the referred-to object to the young generation's other semi-space. If the referred-to object does satisfy the promotion criteria, the thread promotes the referred-to object to the old generation. In both cases, it then schedules the relocated object to be scanned for references. That is, the thread that relocates the object will place the object on a list of objects whose references need to be scanned. Later, objects on that list will be scanned, typically but not necessarily by the thread that placed them there. The thread that does so employs a routine similar to that of FIG. 8 and in particular performs a card-table-entry-updating operation, as FIG. 8's block 232 indicates.

As FIG. 9's blocks 246, 248, and 250 indicate, the updating routine simply involves setting the entry to the current youngergen value if the entry's value is initially clean. In this situation, there is no need for an atomic operation. True, another thread could have updated the card-table entry between the operations represented by FIG. 9's blocks 246 and 250. But such an update would have been performed only by a promoting thread, and the value that it could have placed into the entry could only be the current youngergen value. So the scanning thread's overwriting that value will cause no harm.

If the entry's value is not clean, on the other hand, two of the possible values it could have are the current youngergen value and the cur_youngergen_and_nonclean value. If an operation represented by block 252 determines that the entry has either of those values, the routine simply returns, since the thread should leave unchanged.

Otherwise, the entry's value is either the previous youngergen value or the dirty value. Only a thread that is scanning an object promoted during the current collection will encounter either of those values; a card-scanning thread would have changed either of those values to clean. So a thread that is scanning a newly promoted object has found that the object contains a reference to a young-generation object. As was explained above, the thread will therefore need to record that fact in the card-table entry for the card containing that reference, but it needs to do so without eliminating any indication that the thread responsible for scanning that card still needs to scan it. If the outcome of the block-252 test is negative, therefore, the thread should give the card-table entry the cur_youngergen_and_nonclean value, and this is the purpose of the block-254 operation.

Between the time when the thread performs the block-246 step of reading the entry and the time when the update occurs in accordance with block 254, though, the thread responsible for scanning that card could give the entry the clean value, and it will already have been alerted, in the operation represented by FIG. 7's block 208, to the need to scan the card. In the illustrated embodiment, therefore, the cur_youngergen_and_nonclean value should not result, because it is the card-scanning thread's responsibility to ensure that no such values are left at the end of the interval. So the update operation of block 254 is performed atomically with re-reading the entry to ensure that it has not changed. If it has changed, the atomic operation does not succeed, and, as block 256 indicates, the operation of block 246 is again performed to determine what the proper update value should be.

In any case, the routine returns when the update has been completed. In the case in which FIG. 9's update operation is being performed by the card-scanning thread in accordance with FIG. 8's block 232, that drawings routine returns, too.

For the sake of simplicity, the invention has been described in connection with an embodiment that employs only two generations and in which the card table for only one generation contains the remembered set for only one other one. Of course, the invention is applicable to collectors that employ more than two generations, too. Such collectors may use more than two youngergen values.

To understand why they may, consider a garbage collector that treats the garbage-collected heap as divided into three generations, namely, a youngest generation, a middle generation, and an oldest generation. Suppose that it employs card tables for the middle and oldest generations. And suppose that the middle and oldest generations' card tables serve as the record of the youngest generation's remembered set, while the oldest generation's card table additionally serves as the record of the middle generation's remembered set.

Now consider a youngest-generation collection. If the collector finds a reference in a middle-generation card that refers to a youngest-generation object that survives the collection, it leaves in that card's table entry the current youngergen value, which we will call youngergen_A. It does the same if it finds such a reference in the oldest generation.

If a middle-generation collection follows that youngest-generation collection, the collector will need to treat youngergen_A as a previous youngergen value and therefore a non-clean value, because the youngest-generation collection may have written over a dirty value or a youngergen value left by a previous middle-generation collection. The middle-generation collection will therefore need to employ a different youngergen value, call it youngergen_B, as its current youngergen value, and it may therefore leave youngergen_B values in the oldest-generation card table.

So, if a further youngest-generation collection follows the middle-generation collection, it will encounter youngergen_A values as the previous youngergen values in the middle generation's card table and youngergen_B values as the previous youngergen values in the oldest generation's card table. To distinguish the current youngergen value from the previous youngergen values, the collector may therefore use yet another youngergen value, call it youngergen_C, as the current youngergen value.

Of course, the collector could adopt current youngergen values for a given collection on a per-generation basis. In the scenario just described, for instance, the second youngest-generation collection could have adopted the youngergen_B value as the current youngergen value for the middle generation's card table and the youngergen_A value as the current youngergen value for the oldest generation's card table. Indeed, some embodiments may employ such an approach. But I have found it more convenient to employ a larger number of youngergen values.

In any event, use of a plurality of youngergen values enables the collector to avoid unnecessary work. And, by employing the cur_youngergen and_nonclean value, a collector can avoid the loss of information that it has found. The invention therefore constitutes a significant advance in the art.

What is claimed is:

1. A method of garbage collection comprising:

A) providing a computer system that includes memory and executes a mutator that modifies references in a dynamically allocated heap in the memory;

B) configuring the computer system to act as a garbage collector that:

i) treats the heap as divided into a plurality of generations, including at least one young generation and at least one old generation;

ii) treats the old generation as divided into cards;

iii) maintains a card table, comprising a plurality of card-table fields of which each is associated with a respective card and card range, in which the mutator indicates where it has modified references, a value contained in each card-table field being one of a plurality of possible entry values that include at least one clean-indicating value, at least one non-clean-indicating value, at least one current-younger-generation-and-non-clean-indicating value, and a plurality are younger-generation-indicating values; and iv) performs young-generation collections in each of which the garbage collector performs a reachable-object-identification operation, in which it identifies selected objects in the young generation, and reclaims memory space in the young generation not occupied by objects thus identified, the reachable-object-identification operation including performing in a plurality of garbage-collection threads an old-generation-scanning operation, in which the garbage collector identifies objects in the young generation referred to by old-generation references, the objects thus identified sometimes being promoted into the old generation and sometimes remaining in the young generation, the old-generation-scanning operation including:

a) adopting as the current younger-generation-indicating value for that young-generation collection one of the younger-generation-indicating values different from the younger-generation-indicating value adopted as the current younger-generation-indicating value in the previous old-generation-scanning operation;

b) adopting at least one other younger-generation-indicating value as the previous younger-generation-indicating value for that collection, the previous younger-generation-indicating value being interpreted as a non-clean-indicating value;

c) for each card-table field, employing a garbage-collection thread to perform an entry-processing operation in which that garbage-collection thread:

(1) makes a scan determination, based on the contents of that card-table field, of whether to perform a range-scanning operation on the card range associated with that card-table field, the determination being affirmative if that card-table field contains a non-clean-indicating value or the current-generation-and-non-clean-indicating value; and (2) if the scan determination is affirmative, performs a range-scanning operation, in which:

(a) that garbage-collection thread performs a range-scan reference-inspection operation in which it scans the card range for references that are contained in objects not promoted during that young-generation collection and refer to objects in the young generation, whereby objects thus referred to are identified by the reachable-object-identification operation; and (b) that garbage-collection thread performs a range-scan entry-update operation in which:

(i) the resultant value of that card-table field's contents is the current younger-generation-indicating value if any object thus identified is not promoted as a result; and (ii) otherwise, the value of that card-table field's contents are changed either from a non-clean-indicating value to the clean-indicating value or from the current-younger-generation-and-non-clean-indicating value to the current younger-generation-indicating value; and d) for each object promoted into the old generation during that young-generation collection, employing a garbage-collection thread to perform a promoted-object-scanning operation, in which that garbage-collection thread:

(1) scans that object for references that refer to objects in the young generation, whereby objects thus referred to are identified by the reachable-object-identification operation; and (2) performs an object-scan entry-update operation, in which, for each reference in that object that refers to an object thus identified that is not promoted as a result:

(a) the value of the contents of the card-table field for the card range containing that reference becomes the current-younger-generation-and-non-clean-indicating value if that card-table field's immediately previous contents are a non-clean-indicating value; and (b) otherwise, the resultant value of the contents of the card-table field for the card range containing that reference is the current younger-generation-indicating value; and C) employing the computer system to execute the garbage collector.

2. A method as defined in claim 1 wherein the card range associated with a given card-table field includes the memory occupied by all objects that begin in the card associated with that card-table field.

3. A method as defined in claim 1 wherein the card range associated with a given card-table field is the card associated with that card-table field.

4. A method as defined in claim 1 wherein:

A) the scan determination is negative if the card-table field contains the current younger-generation-indicating value or the clean-indicating value; and B) the garbage collector refrains from performing a range-scan reference-inspection operation on a card range for which the scan determination is negative.

5. A method as defined in claim 1 wherein the range-scan entry-update operation for a given card-table field includes, before the range-scan reference-inspection operation, an entry-initialization operation in which:

A) if the value of the given card-table field's contents is the current-younger-generation-and-non-clean-indicating value, those contents are changed to the current younger-generation-indicating value; and B) the value of the given card-table field's contents is otherwise changed to the clean-indicating value.

6. A method as defined in claim 1 wherein:

A) the possible entry values include a dirty value, which the garbage collector interprets as a non-clean-indicating value; and B) the mutator indicates where it has modified a reference by writing the dirty value into the card-table field with which the card range containing that reference is associated.

7. A method as defined in claim 1 wherein the range-scan entry-update operation places the clean-indicating value into a card-table field only by successfully performing an atomic update operation that includes atomically:

A) reading the contents of that card-table field to verify that it contains a previously determined non-clean-indicating value;

B) placing the clean-indicating value in that card-table field, and thereby being successful, only if the contents thereby read are the previously determined non-clean-indicating value; and C) otherwise being unsuccessful by refraining from placing a value into that card-table field.

8. A method as defined in claim 7 wherein the object-scan entry-update operation places the current-younger-generation-and-non-clean-indicating value into a card-table field only by successfully performing an atomic update operation that includes atomically:

A) reading the contents of that card-table field to verify that it contains a previously determined non-clean-indicating value;

B) placing the current-younger-generation-and-non-clean-indicating value into that card-table field, and thereby being successful, only if the contents thereby read are the previously determined non-clean-indicating value; and C) otherwise being unsuccessful by refraining from placing a value into that card-table field.

9. A method as defined in claim 8 wherein:

A) the scan determination is negative if the card-table field contains the current younger-generation-indicating value or the clean-indicating value; and B) the garbage collector refrains from performing a range-scan reference-inspection operation on a card range for which the scan determination is negative.

10. A method as defined in claim 8 wherein the range-scan entry-update operation for a given card-table field includes, before the range-scan reference-inspection operation, an entry-initialization operation in which:

A) if the value of the given card-table field's contents is the current-younger-generation-and-non-clean-indicating value, those contents are changed to the current younger-generation-indicating value; and B) the value of the given card-table field's contents is otherwise changed to the clean-indicating value.

11. A method as defined in claim 8 wherein:

A) the possible entry values include a dirty value, which the garbage collector interprets as a non-clean-indicating value; and B) the mutator indicates where it has modified a reference by writing the dirty value into the card-table field with which the card range containing that reference is associated.

12. A method as defined in claim 7 wherein:

A) the scan determination is negative if the card-table field contains the current younger-generation-indicating value or the clean-indicating value; and B) the garbage collector refrains from performing a range-scan reference-inspection operation on a card range for which the scan determination is negative.

13. A method as defined in claim 7 wherein the range-scan entry-update operation for a given card-table field includes, before the range-scan reference-inspection operation, an entry-initialization operation in which:

A) if the value of the given card-table field's contents is the current-younger-generation-and-non-clean-indicating value, those contents are changed to the current younger-generation-indicating value; and B) the value of the given card-table field's contents is otherwise changed to the clean-indicating value.

14. A method as defined in claim 7 wherein:

A) the possible entry values include a dirty value, which the garbage collector interprets as a non-clean-indicating value; and B) the mutator indicates where it has modified a reference by writing the dirty value into the card-table field with which the card range containing that reference is associated.

15. A method as defined in claim 1 wherein the object-scan entry-update operation places the current-younger-generation-and-non-clean-indicating value into a card-table field only by successfully performing an atomic update operation that includes atomically:
  A) reading the contents of that card-table field to verify that it contains a previously determined non-clean-indicating value;
  B) placing the current-younger-generation-and- -non-clean-indicating value into that card-table field, and thereby being successful, only if the contents thereby read are the previously determined non-clean-indicating value; and
  C) otherwise being unsuccessful by refraining from placing a value into that card-table field.

16. A computer system comprising:
  A) processor circuitry operable to execute processor instructions; and
  B) memory circuitry, to which the processor circuitry is responsive, that includes a heap in which memory space is dynamically allocated and that contains processor instructions readable by the processor circuitry to configure the computer system as a mutator that modifies references in the heap and as a garbage collector that:
    i) treats the heap as divided into a plurality of generations, including at least one young generation and at least one old generation;
    ii) treats the old generation as divided into cards;
    iii) maintains a card table, comprising a plurality of card-table fields of which each is associated with a respective card and card range, in which the mutator indicates where it has modified references, a value contained in each card-table field being one of a plurality of possible entry values that include at least one clean-indicating value, at least one non-clean-indicating value, at least one current-younger-generation-and-n-on-clean-indicating value, and a plurality are younger-generation-indicating values; and
    iv) performs young-generation collections in each of which the garbage collector performs a reachable-object-identification operation, in which it identifies selected objects in the young generation, and reclaims memory space in the young generation not occupied by objects thus identified, the reachable-object-identification operation including performing in a plurality of garbage-collection threads an old-generation-scanning operation, in which the garbage collector identifies objects in the young generation referred to by old-generation references, the objects thus identified sometimes being promoted into the old generation and sometimes remaining in the young generation, the old-generation-scanning operation including:
      a) adopting as the current younger-generation-indicating value for that young-generation collection one of the younger-generation-indicating values different from the younger-generation-indicating value adopted as the current younger-generation-indicating value in the previous old-generation-scanning operation;
      b) adopting at least one other younger-generation-indicating value as the previous younger-generation-indicating value for that collection, the previous younger-generation-indicating value being interpreted as a non-clean-indicating value;
      c) for each card-table field, employing a garbage-collection thread to perform an entry-processing operation in which that garbage-collection thread:
        (1) makes a scan determination, based on the contents of that card-table field, of whether to perform a range-scanning operation on the card range associated with that card-table field, the determination being affirmative if that card-table field contains a non-clean-indicating value or the current-generation-and-non-clean-indicating value; and
        (2) if the scan determination is affirmative, performs a range-scanning operation, in which:
          (a) that garbage-collection thread performs a range-scan reference-inspection operation in which it scans the card range for references that are contained in objects not promoted during that young-generation collection and refer to objects in the young generation, whereby objects thus referred to are identified by the reachable-object-identification operation; and
          (b) that garbage-collection thread performs a range-scan entry-update operation in which:
            (i) the resultant value of that card-table field's contents is the current younger-generation-indicating value if any object thus identified is not promoted as a result; and
            (ii) otherwise, the value of that card-table field's contents are changed either from a non-clean-indicating value to the clean-indicating value or from the current-younger-generation-and-non-clean-indicating value to the current younger-generation-indicating value; and
      d) for each object promoted into the old generation during that young-generation collection, employing a garbage-collection thread to perform a promoted-object-scanning operation, in which that garbage-collection thread:
        (1) scans that object for references that refer to objects in the young generation, whereby objects thus referred to are identified by the reachable-object-identification operation; and
        (2) performs an object-scan entry-update operation, in which, for each reference in that object that refers to an object thus identified that is not promoted as a result:
          (a) the value of the contents of the card-table field for the card range containing that reference becomes the current-younger-generation-and-non-clean-indicating value if that card-table field's immediately previous contents are a non-clean-indicating value; and
          (b) otherwise, the resultant value of the contents of the card-table field for the card range containing that reference is the current younger-generation-indicating value.

17. A computer system as defined in claim 16 wherein:
  A) the scan determination is negative if the card-table field contains the current younger-generation-indicating value or the clean-indicating value; and
  B) the garbage collector refrains from performing a range-scan reference-inspection operation on a card range for which the scan determination is negative.

18. A computer system as defined in claim 16 wherein the range-scan entry-update operation for a given card-table field includes, before the range-scan reference-inspection operation, an entry-initialization operation in which:
  A) if the value of the given card-table field's contents is the current-younger-generation-and-non-clean-indicating value, those contents are changed to the current younger-generation-indicating value; and
  B) the value of the given card-table field's contents is otherwise changed to the clean-indicating value.

19. A computer system as defined in claim 16 wherein:
A) the possible entry values include a dirty value, which the garbage collector interprets as a non-clean-indicating value; and
B) the mutator indicates where it has modified a reference by writing the dirty value into the card-table field with which the card range containing that reference is associated.

20. A computer system as defined in claim 16 wherein the range-scan entry-update operation places the clean-indicating value into a card-table field only by successfully performing an atomic update operation that includes atomically:
A) reading the contents of that card-table field to verify that it contains a previously determined non-clean-indicating value;
B) placing the clean-indicating value in that card-table field, and thereby being successful, only if the contents thereby read are the previously determined non-clean-indicating value; and
C) otherwise being unsuccessful by refraining from placing a value into that card-table field.

21. A computer system as defined in claim 20 wherein the object-scan entry-update operation places the current-younger-generation-and-non-clean-indicating value into a card-table field only by successfully performing an atomic update operation that includes atomically:
A) reading the contents of that card-table field to verify that it contains a previously determined non-clean-indicating value;
B) placing the current-younger-generation-and-non-clean-indicating value into that card-table field, and thereby being successful, only if the contents thereby read are the previously determined non-clean-indicating value; and
C) otherwise being unsuccessful by refraining from placing a value into that card-table field.

22. A computer system as defined in claim 21 wherein:
A) the scan determination is negative if the card-table field contains the current younger-generation-indicating value or the clean-indicating value; and
B) the garbage collector refrains from performing a range-scan reference-inspection operation on a card range for which the scan determination is negative.

23. A computer system as defined in claim 21 wherein the range-scan entry-update operation for a given card-table field includes, before the range-scan reference-inspection operation, an entry-initialization operation in which:
A) if the value of the given card-table field's contents is the current-younger-generation-and-non-clean-indicating value, those contents are changed to the current younger-generation-indicating value; and
B) the value of the given card-table field's contents is otherwise changed to 8 the clean-indicating value.

24. A computer system as defined in claim 21 wherein:
A) the possible entry values include a dirty value, which the garbage collector interprets as a non-clean-indicating value; and
B) the mutator indicates where it has modified a reference by writing the dirty value into the card-table field with which the card range containing that reference is associated.

25. A computer system as defined in claim 20 wherein:
A) the scan determination is negative if the card-table field contains the current younger-generation-indicating value or the clean-indicating value; and
B) the garbage collector refrains from performing a range-scan reference-inspection operation on a card range for which the scan determination is negative.

26. A computer system as defined in claim 20 wherein the range-scan entry-update operation for a given card-table field includes, before the range-scan reference-inspection operation, an entry-initialization operation in which:
A) if the value of the given card-table field's contents is the current-younger-generation-and-non-clean-indicating value, those contents are changed to the current younger-generation-indicating value; and
B) the value of the given card-table field's contents is otherwise changed to the clean-indicating value.

27. A computer system as defined in claim 20 wherein:
A) the possible entry values include a dirty value, which the garbage collector interprets as a non-clean-indicating value; and
B) the mutator indicates where it has modified a reference by writing the dirty value into the card-table field with which the card range containing that reference is associated.

28. A computer system as defined in claim 16 wherein the object-scan entry-update operation places the current-younger-generation-and-non-clean-indicating value into a card-table field only by successfully performing an atomic update operation that includes atomically:
A) reading the contents of that card-table field to verify that it contains a previously determined non-clean-indicating value;
B) placing the current-younger-generation-and-non-clean-indicating value into that card-table field, and thereby being successful, only if the contents thereby read are the previously determined non-clean-indicating value; and
C) otherwise being unsuccessful by refraining from placing a value into that card-table field.

29. A storage medium containing instructions readable, by a computer system that includes memory including a heap in which space is dynamically allocated to a mutator that modifies references therein, to configure the computer system to operate as a garbage collector that:
A) treats the heap as divided into a plurality of generations, including at least one young generation and at least one old generation;
B) treats the old generation as divided into cards;
C) maintains a card table, comprising a plurality of card-table fields of which each is associated with a respective card and card range, in which the mutator indicates where it has modified references, the a value contained in each card-table field being one of a plurality of possible entry values that include at least one clean-indicating value, at least one non-clean-indicating value, at least one current-younger-generation-and-non-clean-indicating value, and a plurality are younger-generation-indicating values; and
D) performs young-generation collections in each of which the garbage collector performs a reachable-object-identification operation, in which it identifies selected objects in the young generation, and reclaims memory space in the young generation not occupied by objects thus identified, the reachable-object-identification operation including performing in a plurality of garbage-collection threads an old-generation-scanning operation, in which the garbage collector identifies objects in the young generation referred to by old-generation references, the objects thus identified sometimes being promoted into the old generation and sometimes remaining in the young generation, the old-generation-scanning operation including:

i) adopting as the current younger-generation-indicating value for that young-generation collection one of the younger-generation-indicating values different from the younger-generation-indicating value adopted as the current younger-generation-indicating value in the previous old-generation-scanning operation;

ii) adopting at least one other younger-generation-indicating value as the previous younger-generation-indicating value for that collection, the previous younger-generation-indicating value being interpreted as a non-clean-indicating value;

iii) for each card-table field, employing a garbage-collection thread to perform an entry-processing operation in which that garbage-collection thread:

a) makes a scan determination, based on the contents of that card-table field, of whether to perform a range-scanning operation on the card range associated with that card-table field, the determination being affirmative if that card-table field contains a non-clean-indicating value or the current-generation-and-non-clean-indicating value; and b) if the scan determination is affirmative, performs a range-scanning operation, in which:

(1) that garbage-collection thread performs a range-scan reference-inspection operation in which it scans the card range for references that are contained in objects not promoted during that young-generation collection and refer to objects in the young generation, whereby objects thus referred to are identified by the reachable-object-identification operation; and (2) that garbage-collection thread performs a range-scan entry-update operation in which:

(a) the resultant value of that card-table field's contents is the current younger-generation-indicating value if any object thus identified is not promoted as a result; and (b) otherwise, the value of that card-table field's contents are changed either from a non-clean-indicating value to the clean-indicating value or from the current-younger-generation-and-non-clean indicating value to the current younger-generation-indicating value; and iv) for each object promoted into the old generation during that young-generation collection, employing a garbage-collection thread to perform a promoted-object-scanning operation, in which that garbage-collection thread:

a) scans that object for references that refer to objects in the young generation, whereby objects thus referred to are identified as potentially reachable by the reachable-object-identification operation; and b) performs an object-scan entry-update operation, in which, for each reference in that object that refers to an object thus identified that is not promoted as a result:

(1) the value of the contents of the card-table field for the card range containing that reference becomes the current-younger-generation-and-non-clean-indicating value if that card-table field's immediately previous contents are a non-clean-indicating value; and (2) otherwise, the resultant value of the contents of the card-table field for the card range containing that reference is the current younger-generation-indicating value.

30. A storage medium as defined in claim 29 wherein:
A) the scan determination is negative if the card-table field contains the current younger-generation-indicating value or the clean-indicating value; and
B) the garbage collector refrains from performing a range-scan reference-inspection operation on a card range for which the scan determination is negative.

31. A storage medium as defined in claim 29 wherein the range-scan entry-update operation for a given card-table field includes, before the range-scan reference-inspection operation, an entry-initialization operation in which:
A) if the value of the given card-table field's contents is the current-younger-generation-and-non-clean-indicating value, those contents are changed to the current younger-generation-indicating value; and
B) the value of the given card-table field's contents is otherwise changed to the clean-indicating value.

32. A storage medium as defined in claim 29 wherein:
A) the possible entry values include a dirty value, which the garbage collector interprets as a non-clean-indicating value; and
B) the mutator indicates where it has modified a reference by writing the dirty value into the card-table field with which the card range containing that reference is associated.

33. A storage medium as defined in claim 29 wherein the range-scan entry-update operation places the clean-indicating value into a card-table field only by successfully performing an atomic update operation that includes atomically:
A) reading the contents of that card-table field to verify that it contains a previously determined non-clean-indicating value;
B) placing the clean-indicating value in that card-table field, and thereby being successful, only if the contents thereby read are the previously determined non-clean-indicating value; and
C) otherwise being unsuccessful by refraining from placing a value into that card-table field.

34. A storage medium as defined in claim 33 wherein the object-scan entry-update operation places the current-younger-generation-and-non-clean-indicating value into a card-table field only by successfully performing an atomic-update operation that includes atomically:
A) reading the contents of that card-table field to verify that it contains a previously determined non-clean-indicating value;
B) placing the current-younger-generation-and-non-clean-indicating value into that card-table field, and thereby being successful, only if the contents thereby read are the previously determined non-clean-indicating value; and
C) otherwise being unsuccessful by refraining from placing a value into that card-table field.

35. A storage medium as defined in claim 34 wherein:
A) the scan determination is negative if the card-table field contains the current younger-generation-indicating value or the clean-indicating value; and
B) the garbage collector refrains from performing a range-scan reference-inspection operation on a card range for which the scan determination is negative.

36. A storage medium as defined in claim 34 wherein the range-scan entry-update operation for a given card-table field includes, before the range-scan reference-inspection operation, an entry-initialization operation in which:
A) if the value of the given card-table field's contents is the current-younger-generation-and-non-clean-indicating value, those contents are changed to the current younger-generation-indicating value; and B) the value of the given card-table field's contents is otherwise changed to the clean-indicating value.

37. A storage medium as defined in claim 34 wherein:
A) the possible entry values include a dirty value, which the garbage collector interprets as a non-clean-indicating value; and
B) the mutator indicates where it has modified a reference by writing the dirty value into the card-table field with which the card range containing that reference is associated.

38. A storage medium as defined in claim 33 wherein:
A) the scan determination is negative if the card-table field contains the current younger-generation-indicating value or the clean-indicating value; and
B) the garbage collector refrains from performing a range-scan reference-inspection operation on a card range for which the scan determination is negative.

39. A storage medium as defined in claim 33 wherein the range-scan entry-update operation for a given card-table field includes, before the range-scan reference-inspection operation, an entry-initialization operation in which:
A) if the value of the given card-table field's contents is the current-younger-generation-and-non-clean-indicating value, those contents are changed to the current younger-generation-indicating value; and
B) the value of the given card-table field's contents is otherwise changed to the clean-indicating value.

40. A storage medium as defined in claim 33 wherein:
A) the possible entry values include a dirty value, which the garbage collector interprets as a non-clean-indicating value; and
B) the mutator indicates where it has modified a reference by writing the dirty value into the card-table field with which the card range containing that reference is associated.

41. A storage medium as defined in claim 29 wherein the object-scan entry-update operation places the current-younger-generation-and-non-clean-indicating value into a card-table field only by successfully performing an atomic update operation that includes atomically:
A) reading the contents of that card-table field to verify that it contains a previously determined non-clean-indicating value;
B) placing the current-younger-generation-and-non-clean-indicating value into that card-table field, and thereby being successful, only if the contents thereby read are the previously determined non-clean-indicating value; and
C) otherwise being unsuccessful by refraining from placing a value into that card-table field.

42. For reclaiming memory in a dynamically allocated heap in which a mutator modifies references, a garbage collector comprising:
A) means for treating the heap as divided into a plurality of generations, including at least one young generation and at least one old generation;
B) means for treating the old generation as divided into cards;
C) means for maintaining a card table, comprising a plurality of card-table fields of which each is associated with a respective card and card range, in which the mutator indicates where it has modified references, a value contained in each card-table field being one of a plurality of possible entry values that include at least one clean-indicating value, at least one non-clean-indicating value, at least one current-younger-generation-and-non-clean-indicating value, and a plurality are younger-generation-indicating values; and D) means for performing young-generation collections in each of which the garbage collector performs a reachable-object-identification operation, in which it identifies selected objects in the young generation, and reclaims memory space in the young generation not occupied by objects thus identified, the reachable-object-identification operation including performing in a plurality of garbage-collection threads an old-generation-scanning operation, in which the garbage collector identifies objects in the young-generation referred to by old-generation references, the objects thus identified sometimes being promoted into the old generation and sometimes remaining in the young generation, the old-generation-scanning operation including:
  i) adopting as the current younger-generation-indicating value for that young-generation collection one of the younger-generation-indicating values different from the younger-generation-indicating value adopted as the current younger-generation-indicating value in the previous old-generation-scanning operation;
  ii) adopting at least one other younger-generation-indicating value as the previous younger-generation-indicating value for that collection, the previous younger-generation-indicating value being interpreted as a non-clean-indicating value;
  iii) for each card-table field, employing a garbage-collection thread to perform an entry-processing operation in which that garbage-collection thread:
    a) makes a scan determination, based on the contents of that card-table field, of whether to perform a range-scanning operation on the card range associated with that card-table field, the determination being affirmative if that card-table field contains a non-clean-indicating value or the current-generation-and-non-clean-indicating value; and
    b) if the scan determination is affirmative, performs a range-scanning operation, in which:
      (1) that garbage-collection thread performs a range-scan reference-inspection operation in which it scans the card range for references that are contained in objects not promoted during that young-generation collection and refer to objects in the young generation, whereby objects thus referred to are identified by the reachable-object-identification operation; and
      (2) that garbage-collection thread performs a range-scan entry-update operation in which:
        (a) the resultant value of that card-table field's contents is the current younger-generation-indicating value if any object thus identified is not promoted as a result; and
        (b) otherwise, the value of that card-table field's contents are changed either from a non-clean-indicating value to the clean-indicating value or from the current-younger-generation-and-non-clean indicating value to the current younger-generation-indicating value; and
  iv) for each object promoted into the old generation during that young-generation collection, employing a garbage-collection thread to perform a promoted-object-scanning operation, in which that garbage-collection thread:
    a) scans that object for references that refer to objects in the young generation, whereby objects thus referred to are identified by the reachable-object-identification operation; and b) performs an object-scan entry-update operation, in which, for each reference in that object that refers to an object thus identified that is not promoted as a result:

(1) the value of the contents of the card-table field for the card range containing that reference becomes the current-younger-generation-and-non-clean-indicating value if that card-table field's immediately previous contents are a non-clean-indicating value; and (2) otherwise, the resultant value of the contents of the card-table field for the card range containing that reference is the current younger-generation-indicating value.

* * * * *